United States Patent
Tanaka et al.

(10) Patent No.: US 10,250,855 B2
(45) Date of Patent: Apr. 2, 2019

(54) VIDEO DISPLAY APPARATUS, VIDEO DISPLAY SYSTEM, AND LUMINANCE ADJUSTING METHOD OF VIDEO DISPLAY APPARATUS

(71) Applicant: PANASONIC INTELLECTUAL PROPERTY MANAGEMENT CO., LTD., Osaka (JP)

(72) Inventors: Teruto Tanaka, Osaka (JP); Naoki Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/359,426

(22) Filed: Nov. 22, 2016

(65) Prior Publication Data

US 2017/0339379 A1    Nov. 23, 2017

(30) Foreign Application Priority Data

May 23, 2016   (JP) .................................. 2016-102155

(51) Int. Cl.
  *H04N 9/31*    (2006.01)
(52) U.S. Cl.
  CPC ......... *H04N 9/3155* (2013.01); *H04N 9/3147* (2013.01); *H04N 9/3164* (2013.01); *H04N 9/3179* (2013.01); *H04N 9/3182* (2013.01)
(58) Field of Classification Search
  CPC .. H04N 9/3155; H04N 9/3147; H04N 9/3164; H04N 9/3179; H04N 9/12; G03B 21/14; G03B 37/04

(Continued)

(56) References Cited

U.S. PATENT DOCUMENTS

| 8,810,478 B2* | 8/2014 | Asamura ................. G01J 1/32 345/1.1 |
| 2004/0252228 A1* | 12/2004 | Waki ................... H04N 9/3147 348/383 |

(Continued)

FOREIGN PATENT DOCUMENTS

JP   2007-178772 A   7/2007

*Primary Examiner* — Brian P Yenke
*Assistant Examiner* — Sean N. Haiem
(74) *Attorney, Agent, or Firm* — McDermott Will & Emery LLP

(57) ABSTRACT

A video display apparatus functions as a master which is to be connected in loop to other video display apparatus(s) functioning as slave(s) in order to configure a multi-display apparatus. The master video display apparatus includes an extracting unit configured to extract first characteristic data from a received video signal, a controller configured to generate a common video setting value and control a light source of an own apparatus based on the generated common video setting value, an input unit configured to input second characteristic data from the upstream apparatus, and a output unit configured to output the first characteristic data or the common video setting value to the downstream apparatus. The controller outputs the extracted first characteristic data to the downstream apparatus, calculates the common video setting value based on the input second characteristic data, and outputs the calculated common video setting value to the downstream apparatus.

8 Claims, 10 Drawing Sheets

(58) Field of Classification Search
USPC ................ 345/691, 690, 597, 1.1; 715/761; 358/400; 348/383, 512, 745
See application file for complete search history.

(56) References Cited

U.S. PATENT DOCUMENTS

| | | | | |
|---|---|---|---|---|
| 2005/0219271 A1* | 10/2005 | Tanaka | ................... | G03B 21/14 345/690 |
| 2007/0106950 A1* | 5/2007 | Hutchinson | ............ | G09B 5/067 715/761 |
| 2007/0216704 A1* | 9/2007 | Roberts | ................ | G09G 3/3426 345/597 |
| 2008/0246781 A1* | 10/2008 | Surati | ...................... | H04N 5/74 345/690 |
| 2008/0285087 A1* | 11/2008 | Perkins | ................. | G06F 3/1446 358/400 |
| 2011/0134158 A1* | 6/2011 | Onishi | ................. | G09G 3/3426 345/690 |
| 2011/0157255 A1* | 6/2011 | Hsu | ........................ | G09G 3/342 345/690 |
| 2011/0181565 A1* | 7/2011 | Asamura | ................... | G01J 1/32 345/207 |
| 2011/0298843 A1* | 12/2011 | Hajjar | ...................... | G09G 5/10 345/690 |
| 2013/0181884 A1* | 7/2013 | Perkins | ................ | H04N 9/3147 345/1.3 |
| 2013/0215138 A1* | 8/2013 | Suzuki | ................. | G06T 11/001 345/593 |
| 2013/0314458 A1* | 11/2013 | Murai | ................... | G09G 3/3406 345/691 |
| 2013/0321701 A1* | 12/2013 | Halna Du Fretay | ..... | H04N 5/04 348/512 |
| 2015/0138252 A1* | 5/2015 | Okano | ............... | H04N 21/4318 345/690 |
| 2015/0237317 A1* | 8/2015 | Ehara | ................... | H04N 9/3185 348/745 |
| 2015/0347077 A1* | 12/2015 | Kataoka | ............. | G06F 3/1446 345/1.1 |
| 2016/0112689 A1* | 4/2016 | Okamoto | ............. | H04N 9/3147 348/745 |
| 2018/0098021 A1* | 4/2018 | Shimizu | ............. | G03B 21/2006 |

* cited by examiner

VIDEO DISPLAY APPARATUS, VIDEO DISPLAY SYSTEM, AND LUMINANCE ADJUSTING METHOD OF VIDEO DISPLAY APPARATUS

RELATED APPLICATIONS

This application claims the benefit of Japanese Application No. 2016-102155, filed on May 23, 2016, the disclosure of which Application is incorporated by reference herein.

BACKGROUND

1. Technical Field

The present disclosure relates to a video display apparatus which is used, together with other video displays, to configure a multi-display apparatus for displaying an image for one screen with a plurality of display screens.

2. Related Art

JP 2007-178772 A discloses an apparatus that controls an amount of light according to input video signals by using a plurality of video display apparatuses. This apparatus includes a unit configured to detect a characteristic of an input video signal, and a controller configured to control an amount of light based on the detected characteristic. A video signal that is the same as video signals input to other video display apparatuses is input to the characteristic detector. With this arrangement, display screen images having a sense of unity can be realized by similarly and dynamically changing the light-amount control of a plurality of video display apparatuses.

SUMMARY

The present disclosure prevent viewers from feeling discomfort due to irregular features of plurality of display screen images which forms an image for one screen by a multi-display apparatus including a plurality of video display apparatuses.

A video display apparatus according to one aspect of the present disclosure functions as a master video display apparatus, which is to be connected, in loop, to one or more other video display apparatuses functioning as slave video display apparatuses in order to configure a multi-display type video display system for displaying an image for one screen with a plurality of display screens. The video display apparatus functioning as the master video display apparatus includes a light source, a light source controller configured to control the light source, a display device configured to modulate light from the light source based on a video signal to generate image light which forms a display screen image, a video signal receiver configured to receive the video signal, a video characteristic data extracting unit configured to extract first video characteristic data which indicates a characteristic of the video signal received by the video signal receiver, a controller configured to generate a common video setting value for controlling light sources of an own apparatus and the other video display apparatuses and control the light source of the own apparatus based on the common video setting value, a data input unit configured to input, from the other upstream video display apparatus, second video characteristic data which indicates characteristics of video signals to the own apparatus and the other video display apparatuses, and a data output unit configured to output the first video characteristic data or the common video setting value to the other downstream video display apparatus. The controller outputs, to the other downstream video display apparatus, the first video characteristic data extracted the video characteristic data extracting unit. Thereafter, when the second video characteristic data is input, the controller calculates the common video setting value based on the input second video characteristic data, and outputs the calculated common video setting value to the other downstream video display apparatus.

A video display apparatus according to another aspect of the present disclosure functions as a slave video display apparatus, which is to be connected, in loop, to one or more other video display apparatuses each of which functions as a master or slave video display apparatus, in order to configure a multi-display type video display system for displaying an image for one screen with a plurality of display screens. The video display apparatus functioning as the slave video display apparatus includes a light source, a light source controller configured to control the light source, a display device configured to modulate light from the light source based on a video signal to generate image light which forms a display screen image, a video signal receiver configured to receive the video signal, a video characteristic data extracting unit configured to extract first video characteristic data which indicates a characteristic of the video signal received by the video signal receiver, a data input unit configured to input second video characteristic data which indicates a characteristic of a video signal for the other upstream video display apparatus or input a common video setting value for controlling light sources of an own apparatus and the other video display apparatuses, a controller configured to calculate third video characteristic data and control the light source of the own apparatus based on the common video setting value, and a data output unit configured to output the third video characteristic data or the common video setting value to the other downstream video display apparatus. When the second video characteristic data is input from the other upstream video display apparatus, the controller generates the third video characteristic data from the first and second video characteristic data, and outputs the generated third video characteristic data to the other downstream video display apparatus. Thereafter, when the common video setting value is input from the other upstream video display apparatus, the controller outputs the input common video setting value to the other downstream video display apparatus.

A video display system according to the other aspect of the present disclosure is a multi-display type video display system for displaying an image for one screen with a plurality of display screens. The multi-display type video display system includes a master video display apparatus and one or more slave video display apparatuses, the master video display apparatus and the one or more slave video display apparatus being connected in loop, each of the master and slave video display apparatuses including a data input unit and a data output unit, the data input unit of one video display apparatus being connected to the data output unit of another video display apparatus by a signal line. The master video display apparatus includes a first-video-characteristic data extracting unit configured to extract first video characteristic data which indicates a characteristic a received video signal, a first controller configured to generate a common video setting value for controlling light sources of an own apparatus and the slave video display apparatuses and control the light source of the own apparatus based on the common video setting value, a first data input unit configured to input, from the upstream slave video display apparatus, second video characteristic data which indicates characteristics of video signals to the own apparatus and the slave video display apparatus, and a first data output unit configured to output the first video characteristic data or the common video setting value to the downstream slave video display apparatus. The slave video display apparatus includes a second-video-characteristic data extracting unit configured to extract first video characteristic data which indicates a characteristic of a received video signal, a second data input unit configured to input second video characteristic data which indicates a characteristic of a video signal to the upstream master or slave video display apparatus, or input the common video setting value generated by the master video display apparatus, a second controller configured to calculate third video characteristic data and control the light source of an own apparatus based on the common video setting value, and a second data output unit configured to output the third video characteristic data or the common video setting value to the downstream master or slave video display apparatus. The master video display apparatus outputs the first video characteristic data extracted by the first-video-characteristic data extracting unit to the downstream slave video display apparatus. Thereafter, when the second video characteristic data is input by the first data input unit, the master video display apparatus calculates the common video setting value based on the input second video characteristic data, and outputs the calculated common video setting value to the downstream slave video display apparatus. When the second video characteristic data is input from the upstream video display apparatus, the slave video display apparatus generates the third video characteristic data from the first video characteristic data extracted by the second-video-characteristic data extracting unit and the input second video characteristic data, and outputs the generated third video characteristic data to the downstream video display apparatus. Thereafter, when the common video setting value is input from the upstream video display apparatus, the slave video display apparatus outputs the input common video setting value to the downstream video display apparatus.

A video display apparatus according to the present disclosure is connected to other video display apparatuses in order to configure a multi-display apparatus which includes a plurality of video display apparatuses and displays an image for one screen formed of a plurality of display screen images. Thereby, the present disclosure can prevent viewers from feeling discomfort due to irregular features of the display screen images making an image for one screen.

DETAILED DESCRIPTION OF PREFERRED EMBODIMENTS

Hereinafter, embodiments will be described in detail with reference to the drawings as necessary. However, a more than necessary detailed description will be omitted in some cases. For example, a detailed description of already known matters and a redundant description of substantially the same configuration will be omitted in some cases. The omission of such a description is intended to facilitate the understanding of those skilled in the art concerned by avoiding an unnecessarily redundant description.

The appended drawings and the following descriptions will be provided to enable those skilled in the art concerned to sufficiently understand the present disclosure. By such provision, it is not intended to limit the subject described in claims.

(First Embodiment)

Hereinafter, a first embodiment will be described with reference to FIG. 1 to FIG. 7.

Figure 1:
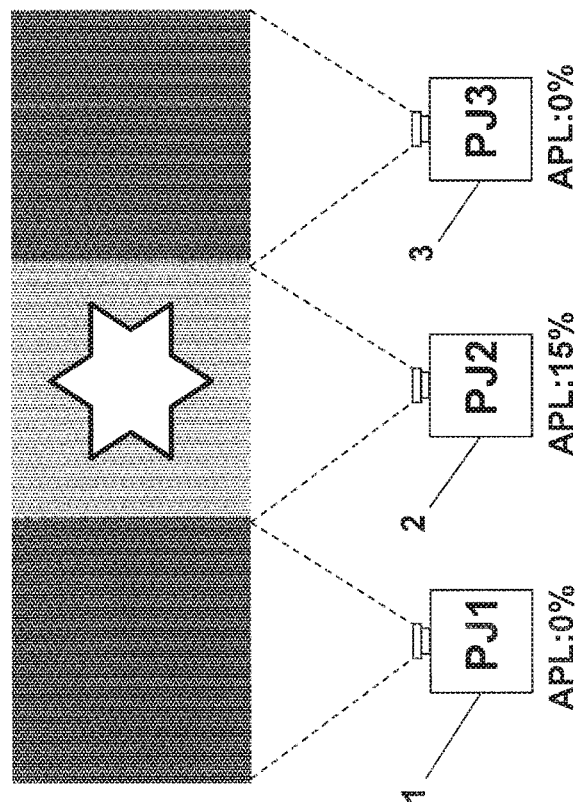
FIG. 1 is a diagram showing a configuration of a conventional multi-display apparatus.

FIG. 1 shows a conventional multi-display apparatus, and shows a state that three projectors including a projector 1 (PJ1), a projector 2 (PJ2), and a projector 3 (PJ3) are aligned in a horizontal direction to face a screen, cod each projector projects a video (including images frame-by-frame) so that the three videos (three projection images) form one screen video (one screen image). Each of the projector 1, the projector 2, and the projector 3 controls brightness of each projector-owned light source in accordance with an average luminance level (hereinafter, referred to as an "APL (Average Picture Level)") of brightness of each input video (projection image), for quality improvement to solve shortage of a bright feeling in a bright scene and black floating in a dark scene, that is, for improving a dynamic contrast. In this case, when APLs of the images projected from the projector 1 and the projector 3 are 0% respectively, an APL of the image projected from the projector 2 is 15%, and these images are looked at as one screen image, luminance of the projection images becomes irregular. Therefore, when the viewers view the projected images as one screen image, a feeling of discomfort given to the viewer, and display quality of the image is deteriorated.

Accordingly, in the present embodiment, such an inconvenience is avoided by the following configuration.

Figure 2:
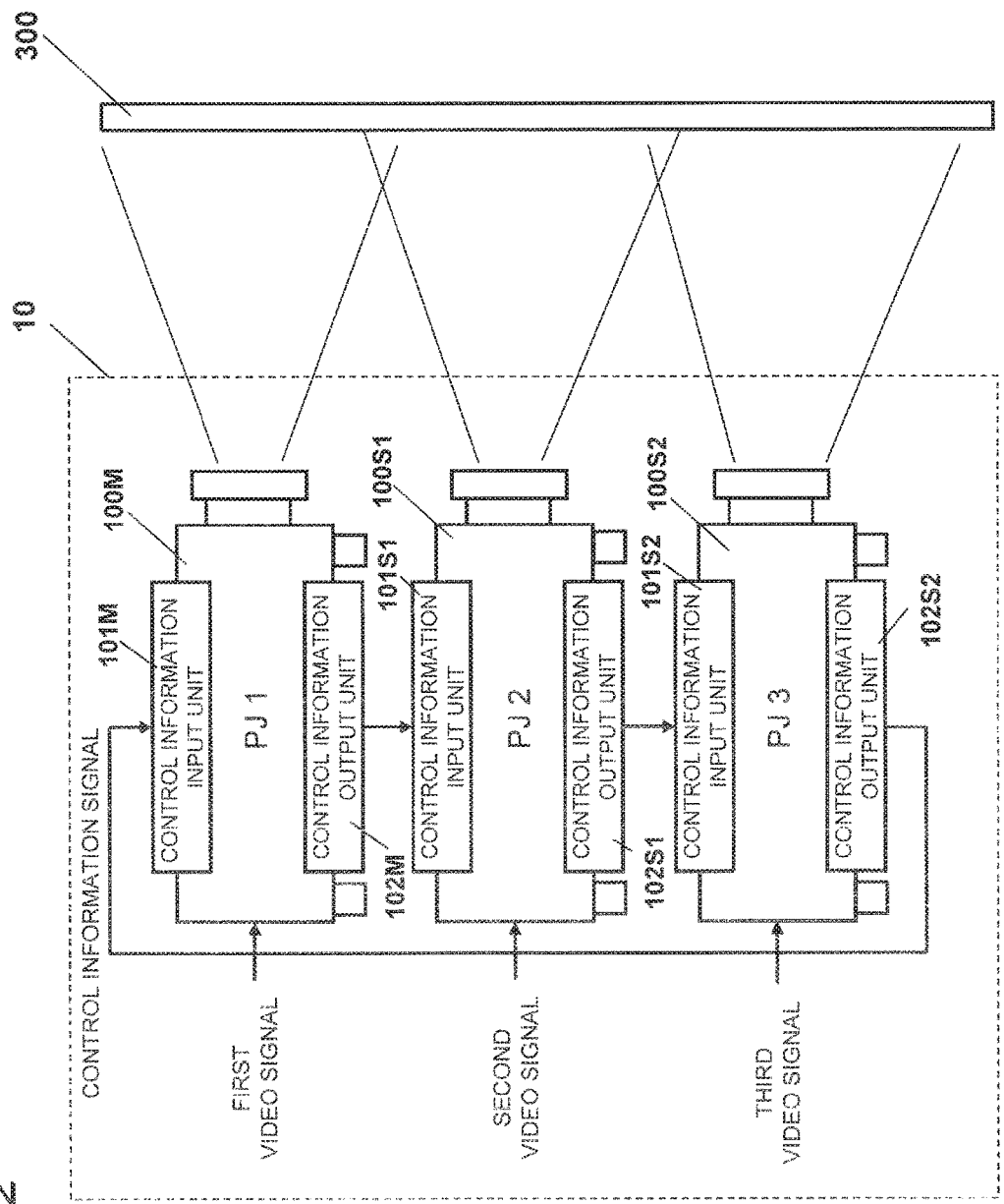
FIG. 2 is a diagram showing a configuration of a multi-display apparatus according to embodiments.

FIG. 2 is a diagram showing a configuration of a multi-display apparatus 10 using projectors according to the present embodiment. As shown in FIG. 2, the multi-display apparatus 10 is configured by a projector 100M, a projector 100S1, and a projector 100S2 that are connected in loop by a cable (a signal line). In the the control information input unit of one projector is connected to the control information output unit of another projector.

That is, a control information output unit 102M of the projector 100M is connected to a control information input unit 101S1 of the projector 100S1. A control information output unit 102S1 of the projector 100S1 is connected to a control information input unit 101S2 of the projector 100S2. A control information output unit 102S2 of the projector 100S2 is connected to the control information input unit 101M of the projector 100M.

In FIG. 2, a first video signal is input from a video signal source to the projector 100M. A video by the first video signal is projected onto a screen 300. A second video signal is input from the video signal source to the projector 100S1. A video by the second video signal is projected onto the screen 300. A third video signal is input from the video signal source to the projector 100S2. A video by the third video signal is projected onto the screen 300. The videos (projection images) projected according to the first to third video signals are aligned on the screen 300, and form one screen video (one screen image).

Figure 3:
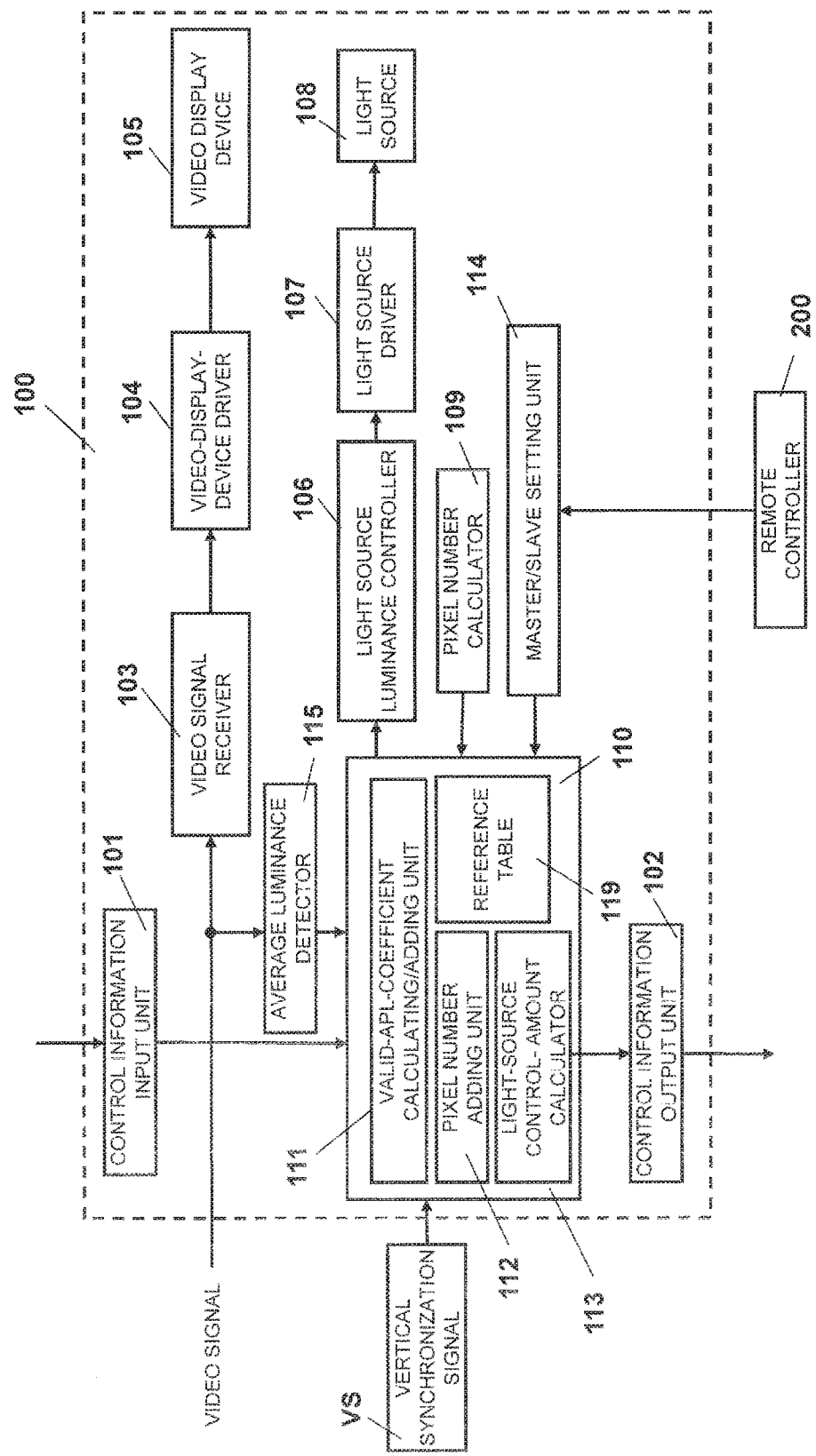
FIG. 3 is a block diagram of a projector according to a first embodiment.

FIG. 3 is a block diagram showing a configuration of a projector. In the present embodiment, the projector 100M, the projector 100S1, and the projector 100S2 have similar configurations. That is, the projectors 100M, 100S1, and 100S2 have the same configurations as the configuration of a projector 100 shown in FIG. 3. However, any one of the projectors 100M, 100S1, and 100S2 has different function from functions of the other projectors. Specifically, the projector 100M serves as a master projector, and the projectors 100S1 and 100S2 serve as slave projectors (a detail will be described later).

As shown in FIG. 3, the projector 100 includes a control information input unit 101, a control information output unit 102, a video signal receiver 103, a video-display-device driver 104, a video display device 105, a light source luminance controller 106, a light source driver 107, a light source 108, a pixel-number calculator 109, a controller 110, a master/slave setting unit 114, and an average luminance detector 115. A remote controller 200 that carries out an operation of the projector 100 sets the master/slave setting unit 114. The control information input unit 101 is an example of a data input unit, and the control information output unit 102 is an example of a data output unit.

A video signal input to the projector 100 is input to the video signal receiver 103. The video signal input to the video signal receiver 103 is delayed by a predetermined time to cancel a gap in a video output timing attributable to a delay in signal processing by the three projectors, and the delayed video signal is input to the video-display-device driver 104. The video-display-device driver 104 drives the video display device 105 based on the video signal. A DMD (Digital Mirror Device) is used as the video display device.

To the control information input unit 101, control information from other projector connected in loop is input. The control information is information of total effective pixels, valid APL coefficient, and an average APL described later.

The control information input to the control information. input unit 101 is input to the controller 110. The controller 110 is for controlling a whole of the projector 100, and is configured by an FPGA (Field-Programmable Gate Array), for example. The controller 110 includes a valid-APL-coefficient calculating/adding unit 111, a pixel number adding unit 112, a light-source control-amount calculator 113, and a reference table 119. The reference table 119 is used when obtaining, from the information of the APL, a light amount coefficient for enhancing a dynamic contrast.

Based on the control by the controller 110, the light source luminance controller 106 is controlled. The light source luminance controller 106 controlled by the controller 110 controls the light source driver 107. The light source driver 107 drives the light source 108, based on the control by the light source luminance controller 106. A solid light source such as a semiconductor laser diode, a metal halide lamp, or the like can be used for the light source 108. Illumination light from the light source 108 is irradiated to the video display device 105. The video display device 105 modulates the irradiated light, based on the video signal, and generates image light for forming a display screen image. This image light is enlarged and projected on the screen by a projection optical system not shown.

Information about effective pixels of the video display device 105 of the projector 100 is supplied from the pixel-number calculator 109 to the controller 110. A setting signal is also input from the master/slave setting unit 114 to the controller 110.

The average luminance detector 115 calculates an average luminance level (that is, an APL) from the input video signal, and supplies the calculated APL to the controller 110. The average luminance detector 115 calculates an average luminance level for each one frame (each one image) of the input video signal. The APL (Average Picture Level, that is, average luminance level) is an example of first video characteristic data, and the average luminance detector 115 is an example of a video characteristic data extracting unit.

Control information (second video characteristic data) from an upstream projector connected to this projector is input from the control information input unit 101 to the controller 110. APL information (first video characteristic data) is also input from the average luminance detector 115 to the controller 110, and further, information about effective pixels of the projector is input from the pixel-number calculator 109 to the controller 110. The controller 110 outputs a calculation result (third video characteristic data) based on these data, to the control information output unit 102. The control information output unit 102 outputs the output data from the controller 110, to a downstream projector connected to this projector. A vertical synchronization signal VS synchronous with the video signal is supplied to the controller 110 in order to take an output timing of the video. The information about the effective pixels is an example of video display apparatus information.

Next, there will be described steps for setting a multi-display apparatus by configuring a system using the projectors shown in FIG. 2 and FIG. 3.

First, an amount of light is adjusted so that the amount of light set in a scene of a brightest projection image projected by each of the projector 100M, the projector 100S1, and the projector 100S2 become mutually the same. Although an amount of light of each projector can be adjusted to become low, the amount of light cannot be adjusted to exceed a maximum amount of light. Therefore, maximum amount of lights of the three projectors are aligned to a smallest maximum amount of light. This adjustment can be carried out by instructing the controller with a remote controller, based on visual observation of luminance of the screen. Other than the adjustment by visual observation, adjustment of a maximum amount of light of each projector can be carried out based on control by a personal computer (PC). Fox example, a camera captures images projected by the projectors and the PC processes the captured images to control the maximum amount of light of projectors.

Next, the projectors 100 are connected in loop by cables as shown in FIG. 2.

After the projectors 100 are connected in loop, one on the three projectors is set as a master, and other two projectors are set as slaves. This setting is carried out, for each projector, by selecting a setting of the master/slave setting unit 114 from a master and a slave, after setting a linkage operation to ON in a linkage operation ON/OFF menu on an OSD (On Screen Display), using the remote controller 200. In the present embodiment, the projector 100M is set as a master, and the projector 100S1 and the projector 100S2 are set as slaves.

In this case, projector 100M has 10000 effective pixels of the video display device by longitudinal 100 pixels and lateral 100 pixels. The projector 100S1 has 9000 effective pixels of the video display device by longitudinal 90 pixels and lateral 100 pixels. The projector 100S2 has 10000 effective pixels of the video display device by longitudinal 100 pixels and lateral 100 pixels. The pixel numbers of these projectors are set small, in order to simplify the description.

When the video display apparatuses are connected in loop by cables to configure the multi-display apparatus 10 in this way, video signals are supplied to the projectors.

Figure 4:
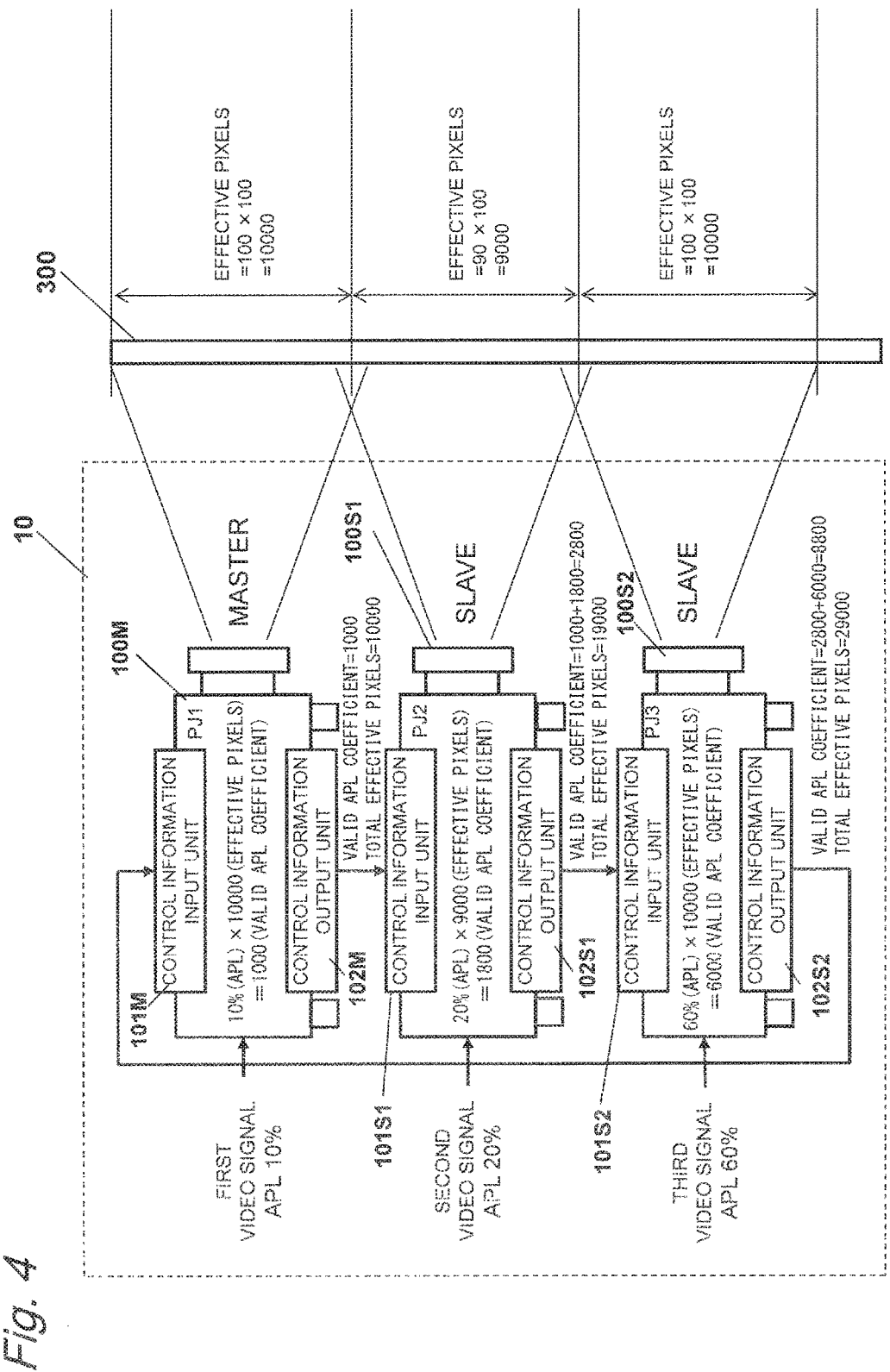
FIG. 4 is a diagram for explaining an operation of a multi-display apparatus according to the first embodiment.

There will be described below a case in which, at a certain timing, as shown in FIG. 4, a first video signal having an APL of 10% is input to the projector 100M, a second video signal having an APL of 20% is input to the projector 100S1, and a third video signal having an APL of 60% is input to the projector 100S2.

The projectors 100M, 100S1, and 100S2 carry out loop processing at two times for each one frame (each one image) of video signals. In first loop processing, by adding and accumulating the APLs of the images indicated by the first to third video signals that are respectively input to the projectors 100M, 100S1, and 100S2, a cumulative value of the APLs of whole images projected by the projectors 100M, 100S1, and 100S2 is obtained. Next, in second loop processing, an average APL of the whole images is obtained based on the cumulative value of the APLs, and the projectors 100M, 100S1, and 100S2 share the obtained average APL as a common average APL. Each of the projectors 100M, 100S1, and 100S2 controls an amount of light of the light source, based on the common average APL. Hereinafter, the loop processing will be described in detail.

(First Loop Processing)

First, the average luminance detector 115 of the master projector 100M detects a level (10%) of the APL, and inputs a value of detected level to the controller 110. The controller 110 acquires the effective pixel number (10000) of the projector 100M from the pixel-number calculator 109. The valid-APL-coefficient calculating/adding unit 111 multiplies the level (10%) of the APL with the effective pixel number (10000) and obtains a valid APL coefficient (1000). The valid APL coefficient calculated in this way and the effective pixel number (total effective pixel number) of the projector 100M are input from the control information output unit 102M to the control information input unit 101S1 of the slave projector 100S1

The average luminance detector 115 of the slave projector 100S1 detects a level (20%) of the APL, and inputs a value of the detected level to the controller 110. The controller 110 acquires the effective pixel number (9000) of the projector 100S1 from the pixel-number calculator 109. The valid-APL-coefficient calculating/adding unit 111 multiplies the level (20%) of the APL with the effective pixel number (9000) and obtains a valid APL coefficient (1800). The valid-APL-coefficient calculating/adding unit 111 adds the valid APL coefficient (1000) from the projector 100M, to the valid APL coefficient (1800) calculated in this way, and obtains an accumulated valid APL coefficient (2800).

Further, the pixel number adding unit 112 adds the effective pixel number (9000) of the projector 100S1 to the effective pixel number (10000) of the projector 100M, and obtains an accumulated total effective pixel number (19000). The valid APL coefficient (2800) and the total effective pixel number (19000) are input from the control information output unit 102S1 of the projector 100S1 to the control information input unit 101S2 of the slave projector 100S2.

The average luminance detector 115 of the slave projector 100S2 detects a level (60%) of the APL, and inputs a value of the detected level to the controller 110. The controller 110 acquires the effective pixel number (10000) of the projector 100S2 from the pixel-number calculator 109. The valid-APL-coefficient calculating/adding unit 111 multiplies the level (60%) of the APL with the effective pixel number (10000) and obtains a valid APL coefficient (6000). The valid-APL-coefficient calculating/adding unit 111 adds the valid APL coefficient (2800) from the projector 100S1, to the valid APL coefficient (6000) calculated in this way, and obtains an accumulated valid APL coefficient (8800).

Further, the pixel number adding unit 112 adds the effective pixel number (10000) of the projector 100S2 to the effective pixel number (19000) from the projector 100S1, and obtains an accumulated total effective pixel number (29000). The valid APL coefficient (8800) and the total effective pixel number (29000) are input from the control information output unit 102S2 of the projector 100S2 to the control information input unit 101M of the master projector 100M. In the first loop processing, a cumulative value of the APLs of the whole images projected by the projectors 100M, 100S1, and 100S2 is obtained as described above.

(Second Loop Processing)

Figure 5:
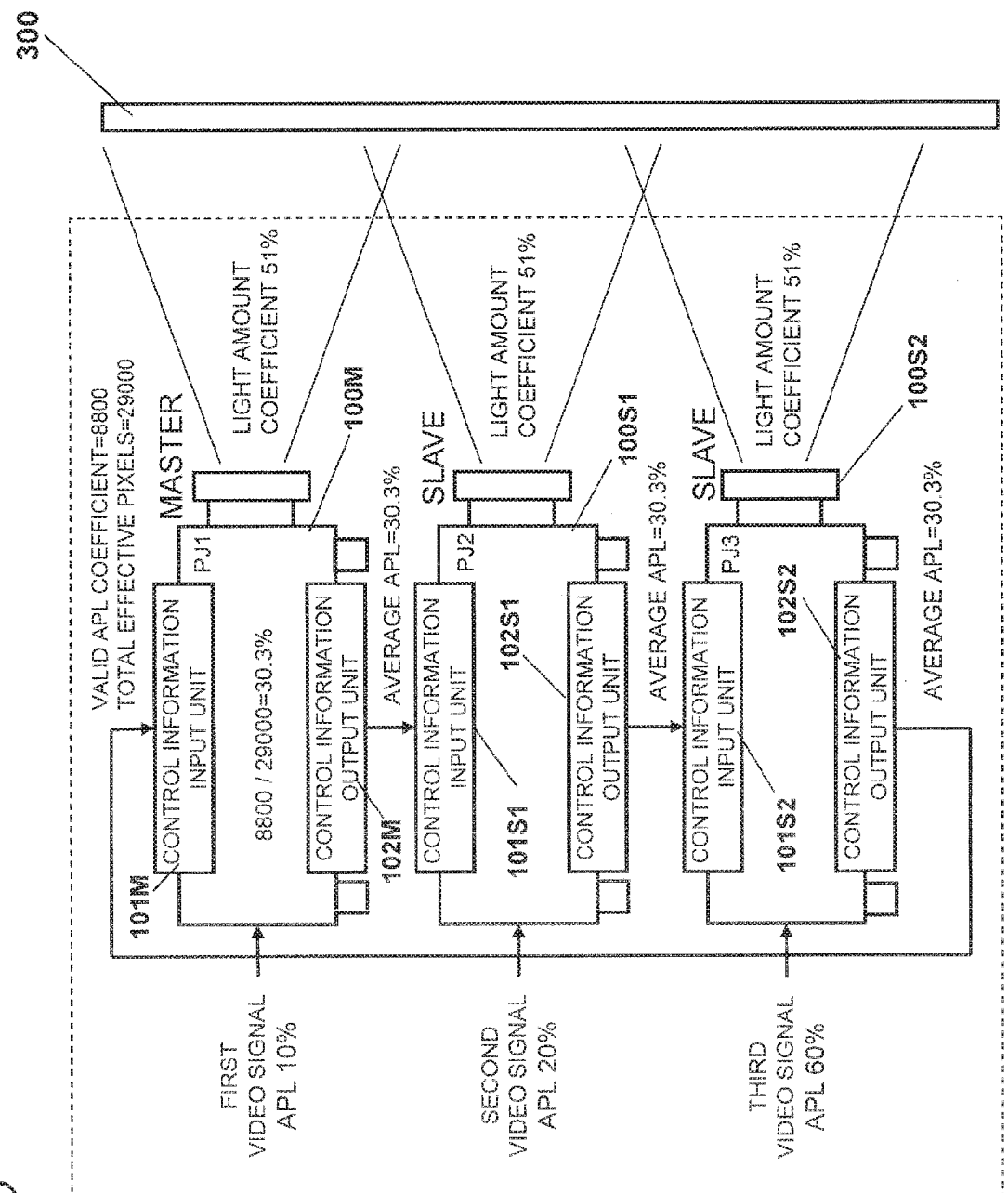
FIG. 5 is a diagram for explaining an operation of the multi-display apparatus according to the first embodiment.
Figure 6:
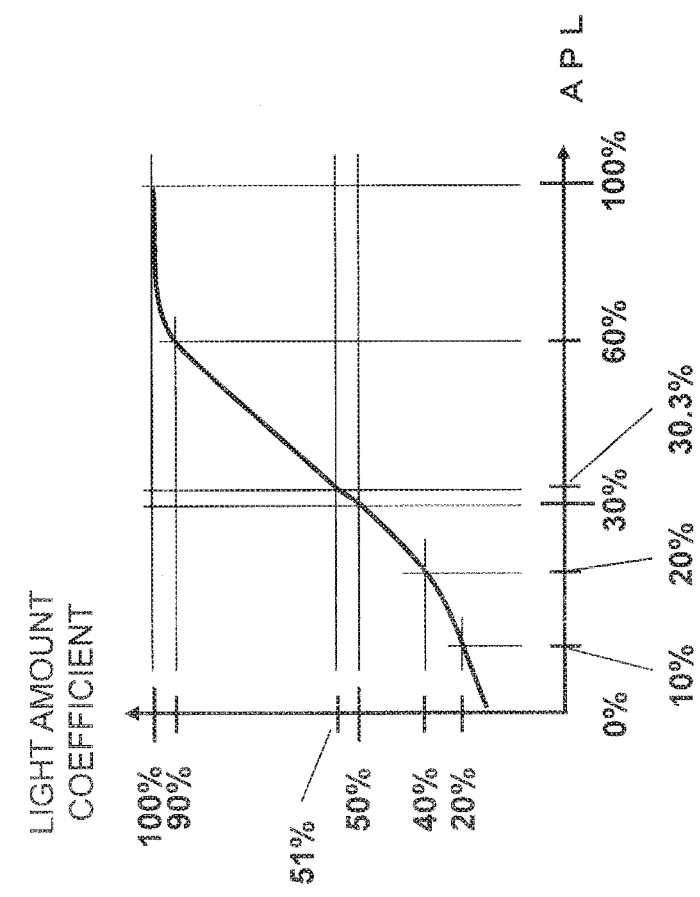
FIG. 6 is a diagram showing an example of a reference table illustrating a relationship between an APL (Average Picture Level) and a light amount coefficient.

Next, as shown in FIG. 5, in the master projector 100M, the light-source control-amount calculator 113 of the controller 110 divides the valid APL coefficient (8800) input to the control information input unit 101M by the total effective pixel number (29000), and obtains an average APL (30.3%). Thereafter, the master projector 100M refers to the reference table 119 provided in the controller 110. In the reference table 119, data indicating a relationship between the APL and the light amount coefficient as shown in FIG. 6 is stored. The master projector 100M obtains a light amount coefficient (51%) set in accordance with an average APL (30.3%), by referring to the reference table. The master projector 100M controls the light source luminance controller 106 based on the light amount coefficient (51%) to set an amount of light of the light source accordingly. The average APL is an example of a common video setting value or common average luminance information.

The average APL (30.3%) obtained by the master projector 100M is input from the control information output unit 102M to the control information input unit 101S1 of the slave projector 100S1. The slave projector 100S1 obtains a light amount coefficient (51%) set in accordance with an average APL (30.3%), by referring to the reference table 119 provides in the controller 110. The slave projector 100S1 controls the light source luminance controller 106 based on the light amount coefficient (51%) to set an amount of light of the light source accordingly.

The slave projector 100S1 inputs the average APL (30.3%) output from the master projector 100M, from the control information output unit 102S1 to the control information input unit 101S2 of the slave projector 100S2. The slave projector 100S2 obtains a light amount coefficient (51%) set in accordance with an average APL (30.3%), by referring to the reference table 119 provided in the controller 110. The slave projector 100S2 controls the light source luminance controller 106 based on the light amount coefficient (51%) to set an amount of light of the light source accordingly. The slave projectors 100S1 and 100S2 recognize that the average APL is input, based on header information of data generated by the master projector 100M and input to the control information input units 101S1 and 101S2, for example.

Thereafter, the slave projector 100S2 inputs the average APL (30.3%) output from the master projector 100M, from the control information output unit 102S2 to the control information input unit 101M of the master projector 100M. Upon receiving the average APL (30.3%) from the slave projector 100S2, the master projector 100M recognizes that the slave projector 100S1 and the slave projector 100S2 are set to a predetermined average APL, and ends the setting. The recognition that the master projector 100M receives the average APL (30.3%) from the slave projector 100S2 can be used to confirm whether the control information is correctly transmitted. However, this recognition is not essential. The above series of operations are carried out for each one frame (each one image) of the video signal.

In this case, as described above, when each of the projectors 1 to 3 individually controls brightness of each light source like the conventional multi-display apparatus shown in FIG. 1, luminance of the projection images of the projectors 1 to 3 becomes irregular when these projection images are looked at as one screen image. For example, in case of a relationship between the APL and the light amount coefficient as shown in FIG. 6, when the APL of the image of the projector 1 is 10%, the APL of the image of the projector 2 is 20%, and the APL of the image of the projector 3 is 60%, then, an amount of light of the light source of the projector 1 is controlled by the light amount coefficient 20%, an amount of light of the light source of the projector 2 is controlled by the light amount coefficient 40%, and an amount of light of the light source of the projector 3 is controlled by the light amount coefficient 90%. In this case, when the images projected by the projectors 1 to 3 are looked at as one screen image, luminance becomes irregular, and a feeling of discomfort is given to the viewers.

Figure 7:
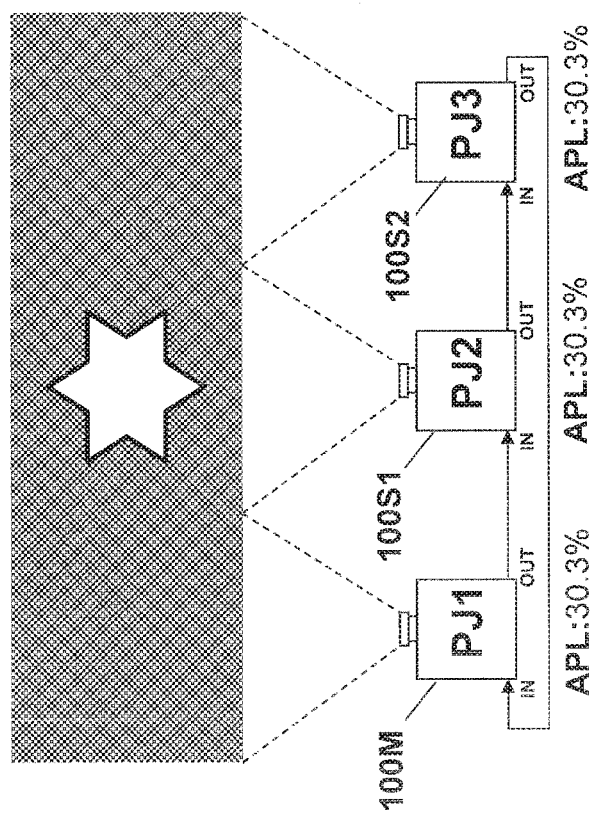
FIG. 7 is a diagram for explaining an effect according to the first embodiment.

On the other hand, according to the present embodiment, as shown in FIG. 7, the APLs of the master projector 100M, the slave projector 100S1, and the slave projector 100S2 are modified to the same value (30.3%) for each one frame. Therefore, when three projected images are combined together as one screen image), irregularity of luminance disappears, and a feeling of discomfort is not given to the viewers.

As described above, in the present embodiment, the multi-display apparatus 10 includes the master projector 100M and the slave projectors 100S1 and 100S2 that are connected in loop. Each of the raster and slave projectors includes the data input unit and the data output unit, and the data input unit of one projector is connected to the data output unit of another projector by a signal line.

The master projector 100M includes the light source 108, the light source luminance controller, 106, the video display device 105, the video signal receiver 103, the average luminance detector 115, the controller 110, the control information input unit 101, and the control information output unit 102. The light source luminance controller 106 controls the light source 108. The video display device 105 modulates light from the light source 108 based on a video signal, and generates image light that forms a display screen image (projection image). The video signal receiver 103 receives the video signal. The average luminance detector 115 extracts the APL which indicates an average luminance level of the video signal received by the video signal receiver 103. The controller 110 generates an average APL for controlling the light sources of the own apparatus (the master projector 100M) and the slave projectors 100S1 and 100S2, and further controls the light source 108 of the master projector 100M based on the average APL. The control information input unit 101 inputs, from the upstream slave projector 100S2, a cumulative value of valid APL coefficients that indicate average luminance levels of video signals to the master projector 100M and the slave projectors 100S1 and 100S2. The control information output unit 102 outputs the APL or the average APL to the downstream slave projector 100S1. The controller 110 outputs the APL extracted by the average luminance detector 115 to the downstream slave projector 100S1. Thereafter, when a cumulative value of the valid APL coefficients is input from the upstream slave projector 100S2, the controller 110 calculates an average APL based on the input cumulative value of the valid APL coefficients, and outputs the calculated average APL to the downstream slave projector 100S1.

Each of the slave projectors 100S1 and 100S2 includes the light source 108, the light source luminance controller 106, the video display device 105, the video signal receiver 103, the average luminance detector 115, the controller 110, the control information input unit 101, and the control information output unit 102. The light source luminance controller 106 controls the light source 108. The video display device 105 modulates light from the light source 108 based on a video signal, and generates image light that forms a display screen image. The video signal receiver 103 receives the video signal. The average luminance detector 115 extracts the APL which indicates an average luminance level of the video signal received by the video signal receiver 103. In control information input unit 101 inputs a valid APL coefficient indicating an average luminance level of the video signal to the upstream projector, or inputs an average APL for controlling the light sources of the master projector 100M and the slave projectors 100S1 and 100S2. The controller 110 calculates a valid APL coefficient, and further controls the light source of the own apparatus (the slave projectors 100S1, 100S2) based on the average APL. The control information output unit 102 outputs the valid APL coefficient or the average APL to the downstream projector. When the valid APL coefficient is input from the upstream projector, the controller 110 generates a cumulative value of the valid APL coefficients from the APL of the own apparatus (the slave projectors 100S1, 100S2) and the valid APL coefficient of the upstream projector. The controller 110 outputs the generated cumulative value of the valid APL coefficients to the downstream projector. Thereafter, when an average APL is input from the upstream projector, the controller outputs the input average APL to the downstream projector.

In the manner as described above, the master projector 100M outputs the APL indicating the average luminance level of the video signal of the master projector 100M, to the downstream slave projector 100S1. Thereafter, the master projector 100M generates an average APL for controlling the light sources of the master projector 100M and the slave projectors 100S1 and 100S2, based on the cumulative value, returning from the slave projector 100S2, of the valid APL coefficients that indicate respective average luminance levels of video signals to the master projector 100M and the slave projectors 100S1 and 100S2. The master projector 100M outputs the generated average APL to the slave projector 100S1. With this arrangement, the master projector 100M and the slave projectors 100S1 and 100S2 can control an amount of light of the light sources to be the same, based on the average APL. Therefore, in case that an image for one screen is formed of a plurality of display screen images displayed by the master projector 100M and the slave projectors 100S1 and 100S2, irregularity of luminance disappears, and a feeling of discomfort is not given to the viewers.

As described above, each of the slave projectors 100S1 and 100S2 generates a cumulative value of valid APL coefficients based on the valid APL coefficient from the upstream projector and the APL of the own apparatus (the slave projectors 100S1, 100S2), and outputs the generated cumulative value to the downstream projector. Accordingly, the cumulative value of the valid APL coefficients of all video signals of the master projector 100M and the slave projectors 100S1 and 100S2 can be returned to the master projector 100M. Therefore, the master projector 100M can generate the average APL for controlling the light sources of the master projector 100M and the slave projectors 100S1 and 100S2, based on the cumulative value of the valid APL coefficients. Thereafter, the slave projectors 100S1 and 100S2 control the respective light sources, based on the average APL from the master projector 100M. With this arrangement, the master projector 100M and the slave projectors 100S1 and 100S2 can control the amount of light of the light sources to be the same, based on the average APL. Therefore, in case that an image for one screen is formed of a plurality of display screen images displayed by the master projector 100M and the slave projectors 100S1 and 100S2, irregularity of luminance disappears, and a feeling of discomfort is not given to the viewers.

(Second Embodiment)

A second embodiment will be described with reference to FIG. 8 to FIG. 10 and FIG. 6.

Figure 8:
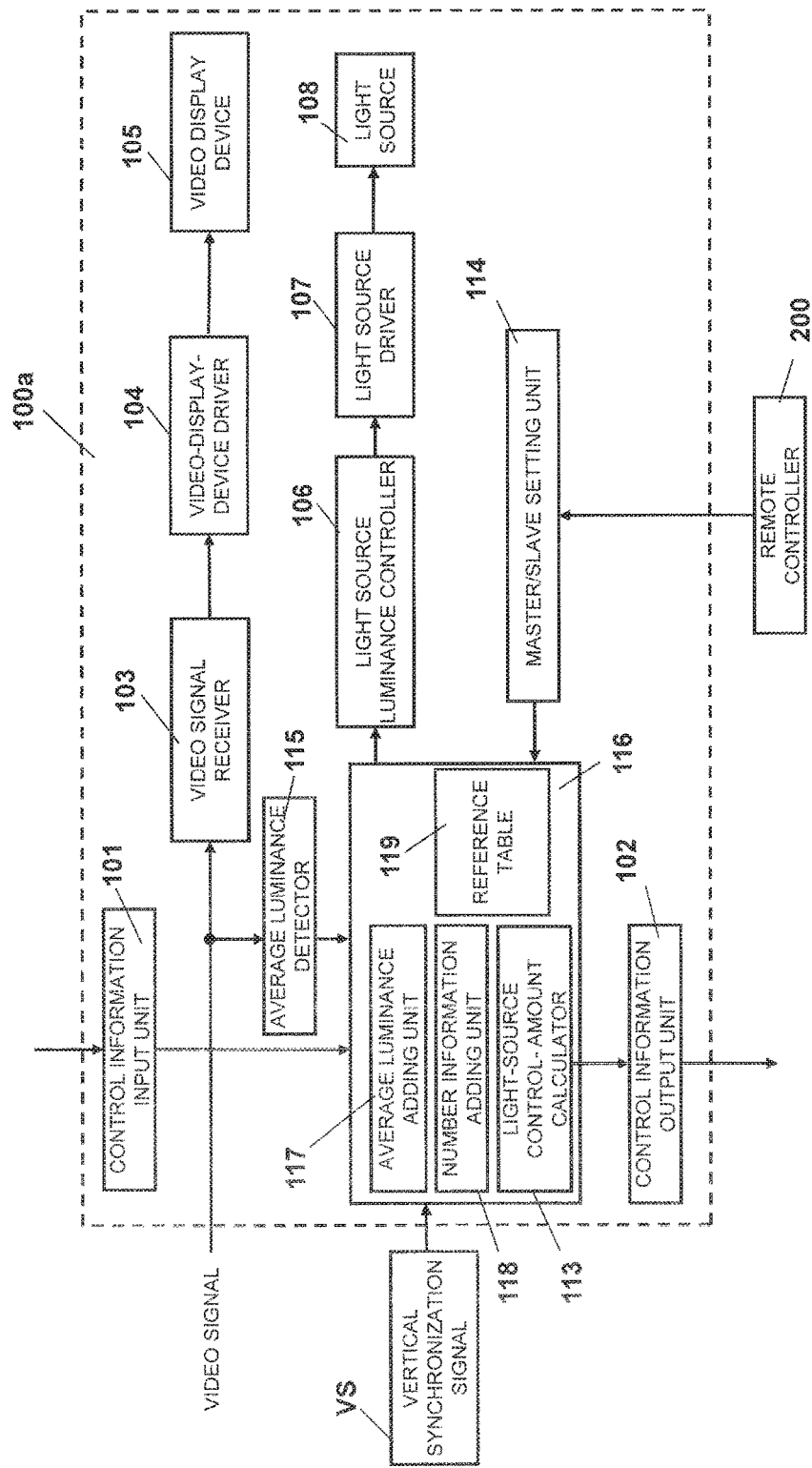
FIG. 8 is a block diagram of a projector according to a second embodiment.

FIG. 8 is a block diagram showing a configuration of a projector 100a according to the second embodiment. In the projector 100a according to the second embodiment, an internal configuration of a controller 116 is different from the internal configuration of the projector 100 in the first embodiment shown in FIG. 3. That is, the controller 116 includes an average luminance adding unit 117, a number information adding unit 118, and the light-source control-amount calculator 113. The pixel-number calculator 109 is not provided in the projector 100a. In the projector 100a in FIG. 8, components that are the same as the components of the projector 100 in the first embodiment in FIG. 3 are attached with the same reference numerals, and a redundant description of these components will be omitted.

Figure 9:
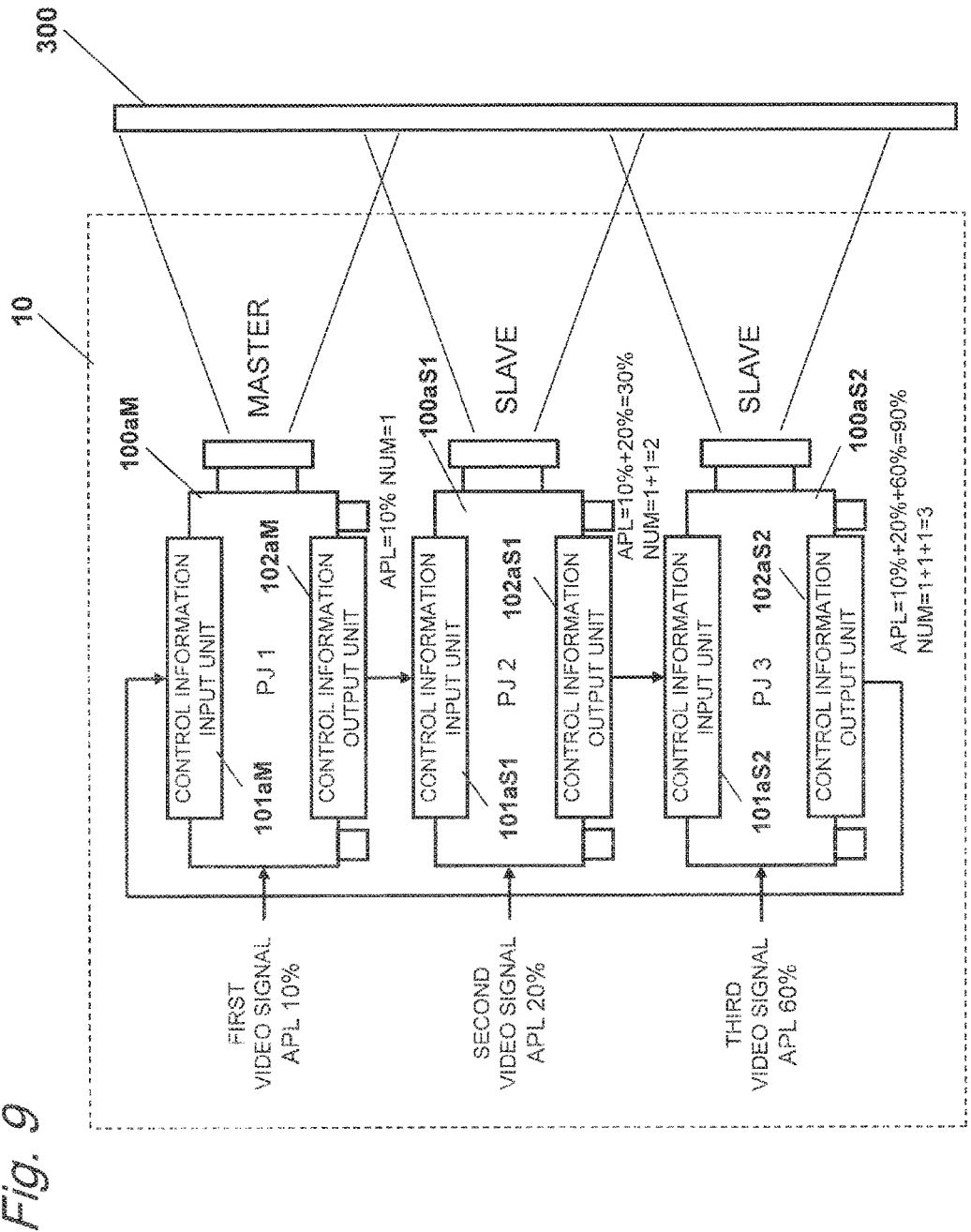
FIG. 9 is a diagram for explaining an operation of a multi-display apparatus according to the second embodiment.

FIG. 9 is a diagram showing the multi-display apparatus 10 that uses the projector 100a according to the present embodiment. In a similar manner to that in the first embodiment, the multi-display apparatus 10 includes a projector 100aM, a projector 100aS1, and a projector 100aS2 that are connected in loop by cables. In the loop, the control information input unit of one projector is connected to the control information output unit of another projector.

That is, a control information output unit 102aM of the projector 100aM is connected to a control information input unit 101aS1 of the projector 100aS1. A control Information output unit 102aS1 of the projector 100aS1 is connected to a control information input unit 101aS2 of the projector 100aS2. A control information output unit 102aS2 of the projector 100aS2 connected to the control information input unit 101aM of the projector 100aM.

FIG. 9, a first video signal is input from a video signal source to the projector 100aM. A video by the first video signal is projected onto a screen 300. A second video signal is input from a video signal source to the projector 100aS1. A video by the second video signal is projected onto the screen 300. A third video signal is input from a video signal source to the projector 100aS2. A video by the third video signal is projected onto the screen 300. The videos (projection images) projected according to the first to third video signals are aligned on the screen 300, and form one screen video (one screen image).

Referring back to FIG. 8, control information is input to the control information input unit 101 from the projectors connected in loop. This control information includes APL information, and projector-connection number information and average APL information.

The control information input to the control information input unit 101 is input to the controller 116. The controller 116 is for controlling a whole of the projector 100a, and is also configured by the FPGA in the present embodiment. The controller 116 includes the average luminance adding unit 117, the number information adding unit 118, and the light-source control-amount calculator 113, as described above.

Next, there will be described steps for setting a multi-display apparatus by using the projectors shown in FIG. 8.

First, an amount of light is adjusted so that the amount of light set in a scene of a brightest projection image projected by each of the projector 100aM, the projector 100aS1, and the projector 100aS2 become mutually the same. Because a detail of this setting is similar to the setting in the first embodiment, a description of the setting will be omitted.

Next, the projectors 100a are connected in loop by cables as shown in FIG. 9.

After the projectors 100a are connected in loop, one of the three projectors is set as a master, and the rest two projectors are set as slaves. Because a detail of this setting is also similar to the setting in the first embodiment, a description of the setting will be omitted.

When the video display apparatuses are connected in loop by cables to configure the multi-display apparatus 10 in this way, video signals are supplied to the projectors.

There will be described below a case in which, at a certain timing, as shown in FIG. 9, a first video signal having an APL of 10% is input to the projector 100aM, a second video signal having an APL of 20% is input to the projector 100aS1, and a third video signal having an APL of 60% is input to the projector 100aS2.

(First Loop Processing)

First, the average luminance detector 115 of the master projector 100aM detects a level (10%) of the APL, and inputs a value of the detected level to the controller 116. In the controller 116, the average luminance adding unit 117 adds a level (10%) of the APL to "0". The control information output unit 102aM outputs an APL (10%), as a cumulative value, and inputs the APL (10%) to the control information input unit 101aS1 of the projector 100aS1. In the controller 116 of the master projector 100aM, the number information adding unit 118 adds a count number "1" of the self to "0". The control information output unit 102aM outputs "1", as d cumulative value, and inputs the "1" to the control information input unit 101aS1 of the slave projector 100aS1.

The slave projector 100aS1 detects a level (20%) of the APL by the average luminance detector 115, and inputs a value of the detected level to the controller 116. In the controller 116, the average luminance adding unit 117 adds a level (20%) of the APL to the value (10%) which is input to the control information input unit 101aS1. The control information output unit 102aS1 outputs an APL (30%), as a cumulative value, and inputs the APL (30%) to the control information input unit 101aS2 of the slave projector 100aS2. In the controller 116 of the slave projector 100aS1, the number information adding unit 118 adds a count number "1" of the self to "1" which is input to the control information input unit 101aS1. The control information output unit 102aS1 outputs "2", as a cumulative value, and inputs the "2" to the control information input unit 101aS2 of the slave projector 100aS2.

The average luminance detector 115 of the slave projector 100aS2 detects a level (60%) of the APL, and inputs a value of the detected level to the controller 116. In the controller 116, the average luminance adding unit 117 adds a level (60%) of the APL to the value (30%) input to the control information input unit 101a S2. The control information output unit 102aS2 outputs an APL (90%), as a cumulative value, and inputs the APL (90%) the control information input unit 101aM of the raster projector 100aM. In the controller 116 of the slave projector 100aS2, the number information adding unit 118 adds a count number "1" of the self to "2" which is input to the control information input unit 101aS2. The control information output unit 102aS2 outputs "3", as a cumulative value, and inputs the "3" to the control information input unit 101aM of the master projector 100aM.

(Second Loop Processing)

Figure 10:
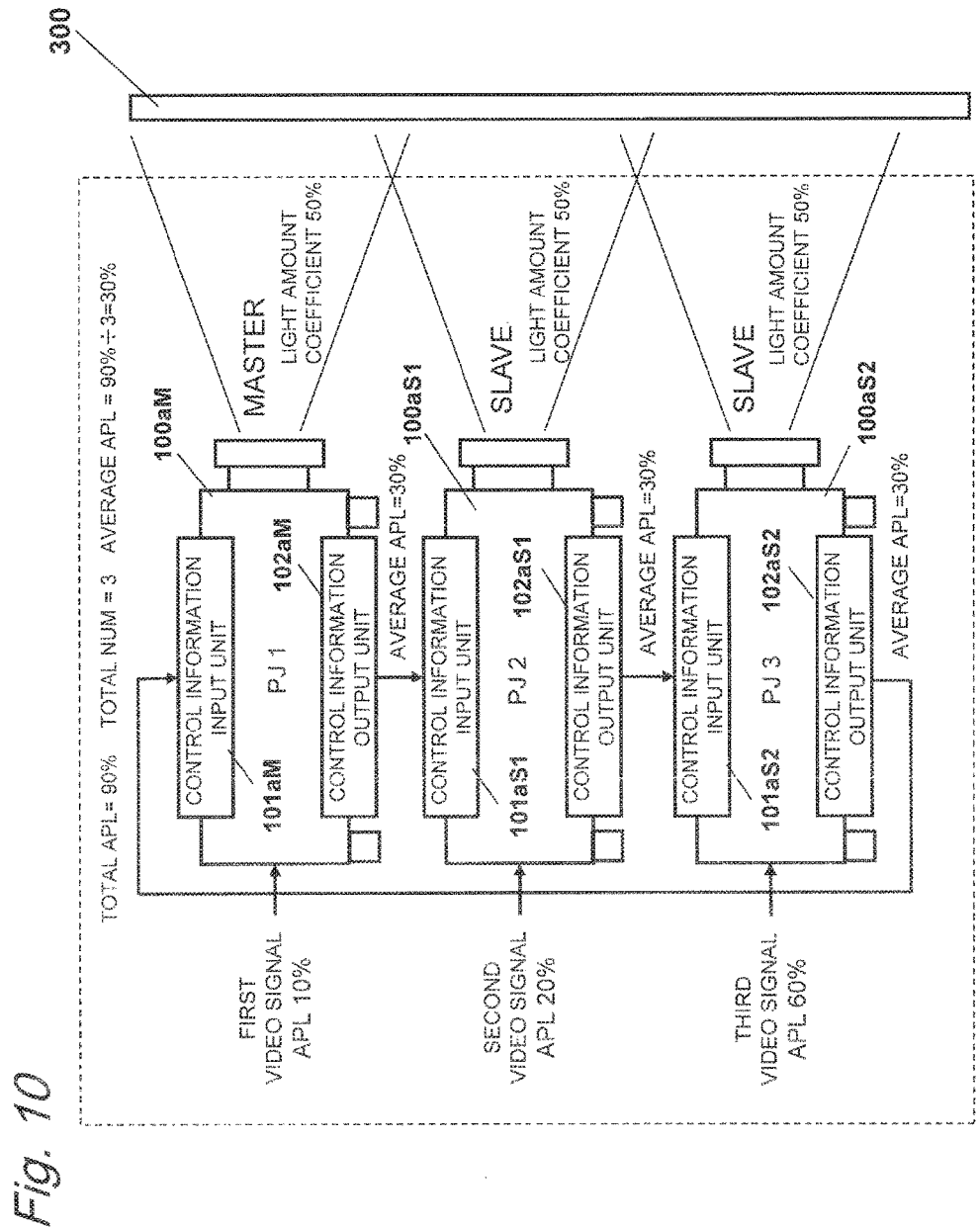
FIG. 10 is a diagram for explaining an operation of the multi-display apparatus according to the second embodiment.

Next, as shown in FIG. 10, in the master projector 100aM, the light-source control-amount calculator 113 of the controller 116 divides the cumulative value (90%) of the APLs input to the control information input unit 101aM by the number information (total number 3), and obtains an average APL (30%). Thereafter, the master projector 100aM refers to the reference table 119 provided in the controller 116. In the reference table 119, data indicating a relationship between the APL and the light amount coefficient as shown in FIG. 6 is stored. From the reference table, a light amount coefficient (50%) set in accordance with an average APL (30%) is obtained. The master projector 100aM controls light source luminance controller 106 based on the light amount coefficient. (50%)

The average APL (30%) obtained by the master projector 100M is input from the control information output unit 102aM to the control information input unit 101aS1 of the slave projector 100aS1. The slave projector 100aS1 obtains a light amount coefficient (50%) set in accordance with an average APL (30%), by referring to the reference table 119 provided in the controller 116. The slave projector 100aS1 controls the light source luminance controller 106 based on the light amount coefficient (50%).

The slave projector 100aS1 inputs the average APL (30%) output from the master projector 100M, from the control information output unit 102aS1 to the control information input unit 101aS2 of the slave projector 100aS2. The slave projector 100aS2 obtains a light amount coefficient (50%) set in accordance with an average APL (30%), by referring to the reference 119 provided in the controller 116. The slave projector 100aS2 controls the light source luminance controller 106 based on the light amount coefficient (50%).

Thereafter, the slave projector 100aS2 inputs the average APL (30%) output from the master projector 100aM, from the control information output unit 102aS2 to the control information input unit 101aM of the master projector 100aM. Upon receiving the average APL (30%) from the slave projector 100aS2, the master projector 100aM recognizes that the slave projector 100aS1 and the slave projector 100aS2 are set to a predetermined average APL, and completes the setting. The recognition that the master projector 100aM receives the average APL (30%) from the slave projector 100aS2 can be used to confirm whether the control information is correctly transmitted. However, this recognition is not essential. The above series of operations are carried out for each one frame (image) of the video signal.

In the present embodiment, advantages similar to the advantages in the first embodiment can be obtained. The master projector 100aM outputs the APL indicating the average luminance level of the video signal of the own apparatus (the master projector 100aM), to the downstream slave projector 100aS1. Thereafter, the master projector 100aM generates an average APL for controlling the light sources of the master projector 100aM and the slave projectors 100aS1 and 100aS2, based on the cumulative value, returning from the slave projector 100aS2, of the APL that indicate respective average luminance levels of video signals to the master projector 100aM and the slave projectors 100aS1 and 100aS2. The master projector 100aM outputs the generated average APL to the slave projector 100aS1. With this arrangement, the master projector 100aM and the slave projectors 100aS1 and 100aS2 can control the amount of light of the light sources to be the same, based on the average APL. Therefore, in case that an image for one screen is formed of a plurality of display screen images displayed by the master projector 100aM and the slave projectors 100aS1 and 100aS2, irregularity of luminance disappears, and a feeling of discomfort is not given to the viewers.

Each of the slave projectors 100aS1 and 100aS2 generates a cumulative value of APLs based on the APL from the upstream projector and the APL of the own apparatus (each of the slave projectors 100aS1 and 100aS2), and outputs the generated cumulative value to the downstream projector. With this arrangement, the cumulative value of the APL of all video signals of the master projector 100aM and the slave projectors 100aS1 and 100aS2 can be returned to the master projector 100aM. Therefore, the master projector 100aM can generate the average APL for controlling the light sources of the master projector 100aM and the slave projectors 100aS1 and 100aS2, based on the cumulative value of the APL. Thereafter, the slave projectors 100aS1 and 100aS2 control the respective light sources based on the average APL from the master projector 100aM. With this arrangement, the master projector 100aM and the slave projectors 100aS1 and 100aS2 can control the amount of light of the light sources to be the same, based on the average APL. Therefore, in case that an image for one screen is formed of a plurality of display screen images displayed by the master projector 100aM and the slave projectors 100aS1 and 100aS2, irregularity of luminance disappears, and a feeling of discomfort is not given to the viewers.

(Other Embodiments)

The embodiments are described above as an exemplification of the technique disclosed in the present patent application. However, the technique in the present disclosure is not limited to the technique described in the embodiments, and can be also applied to embodiments in which alteration, replacement, addition, or omission is carried out. Further, new embodiments can be also prepared by combining configuration elements described in the above embodiments.

(1) That is, although three projectors are connected as an exemplification in the present disclosure, when two or more projectors are used, the present disclosure can be applied to the case of connecting the two or more projectors in loop.

(2) Although the controller is configured by the FPGA, the controller can also be configured by a microcomputer.

(3) Although projectors are used as video display apparatuses, this is an example of the video display apparatuses, and liquid-crystal display apparatuses or LED (Light Emitting Diode) display apparatuses may also be used as video display apparatuses.

(4) In the present embodiment, an average APL (Average Picture Level, or average luminance level) of whole images projected by the three projectors is obtained. The amount of light of the light sources is controlled based on the average APL. However, the present disclosure is not limited to this case. In addition to the average APL of the whole images projected by a plurality of projectors, peak luminance of the whole images may be obtained, and the amount of light of the light sources may be controlled based on the average APL and the peak luminance. Hereinafter, an example of this idea applied to the first embodiment will be described. This idea can be similarly applied to the second embodiment.

For example, in the first embodiment, the average luminance detector 115 detects peak luminance (first video characteristic data) of a video (a projection image) indicated by an input video signal. The controller 110 compares peak luminance from the average luminance detector 115 with peak luminance (second video characteristic data) input from the upstream projector to the control information input unit 101. The controller 110 selects larger peak luminance, and outputs the selected peak luminance (third video characteristic data) to the downstream projector via the control information output unit 102. That is, the first video characteristic data includes the peak luminance in addition to the APL, and each of the second and third video characteristic data includes the peak luminance in addition to the average APL.

More specifically, in the first loop processing, the average luminance detector 115 of the master projector 100M detects the peak luminance of the image indicated by the video signal which is input to the master projector 100M. The controller 110 of the master projector 100M outputs the peak luminance detected by the average luminance detector 115, to the slave projector 100S1 via the control information output unit 102M. The average luminance detector 115 of the slave projector 100S1 detects the peak luminance of the image indicated by the video signal input to the slave projector 100S1. The controller 110 of the slave projector 100S1 compares the peak luminance detected by the average luminance detector 115 with the peak luminance input from the projector 100M via the control information input unit 101S1. The controller 110 outputs larger peak luminance to the slave projector 100S2 via the control information output unit 102S1. The average luminance detector 115 of the slave projector 100S2 detects the peak luminance of the image indicated by the video signal input to the slave projector 100S2. The controller 110 of the slave projector 100S2 compares the peak luminance detected by the average luminance detector 115 with the peak luminance input from the projector 100S1 via the control information input unit 101S2. The controller 110 outputs larger peak luminance to the master projector 100M via the control information output unit 102S2. With this arrangement, the master projector 100M can know the peak luminance of the whole images.

Next, in the second loop processing, when setting an amount of light of the light source based on the average APL of the whole images as described above, the master projector 100M takes into consideration the peak luminance. For example, when the peak luminance is higher than a predetermined value, the master projector 100M does not set an average APL lower than a predetermined value set in advance. With this arrangement, in the image of a low APL like an image of the night sky, for example, it is possible to avoid the stars from becoming dark in the image due to excessive decreasing of an amount of light of the light source.

(5) Further, according to the present disclosure, on behalf of the average APL (average luminance level) of the whole images projected by a plurality of projectors, a histogram (for example, a luminance distribution) of brightness of the whole images may be obtained. Based on this histogram, an amount of light of the light source may be controlled. Hereinafter, an example of this idea applied to the first embodiment will be described. This idea can be similarly applied to the second embodiment.

For example, in the first embodiment, the detector 115 detects a luminance distribution (first video characteristic data) of the video (the projection image) indicated by the input video signal. For example, the luminance distribution includes proportions of four regions to the whole images. The four regions include a region of which luminance is 0% or more and less than 25%, a region of which luminance is 25% or more and less than 50%, a region of which luminance is 50% or more and less than 75%, and a region of which luminance is 75% or more and 100% or less. The controller 110 adds a luminance distribution from the detector 115 to the luminance distribution (second video characteristic data) input from, the upstream projector to the control information input unit 101, in each of the tour luminance regions. The controller 110 outputs an accumulated average luminance distribution (third video characteristic data) to the downstream projector via the control information output unit 102. That is, the first video characteristic data includes the luminance distribution on behalf of the APL, and each of the second and third video characteristic data includes the average luminance distribution on behalf of the average APL.

More specifically, in the first loop processing, the detector 115 of the master projector 100M detects the luminance distribution of the video (the projection image) indicated by the video signal which is input to the master projector 100M. The controller 110 of the master projector 100M outputs the luminance distribution detected by the detector 115, to the slave projector 100S1 via the control information output unit 102M. The detector 115 of the slave projector 100S1 detects the luminance distribution of the image indicated by the video signal which is input to the slave projector 100S1. The controller 110 of the slave projector 100S1 adds the luminance distribution detected by the detector 115 to the luminance distribution which is input from the projector 100M via the control information input unit 101S1, in each of the four luminance regions. The controller 110 outputs an accumulated average luminance distribution to the slave projector 100S2 via the control information output unit 102S1. The detector 115 of the slave projector 100S2 detects the luminance distribution of the image indicated by the video signal which is input to the slave projector 100S2. The controller 110 of the slave projector 100S2 adds the luminance distribution detected by the detector 115 to the luminance distribution which is input from the projector 100S1 via the control information input unit 101S2, in each of the four luminance regions. The controller 110 outputs an accumulated average luminance distribution to the master projector 100M via the control information output unit 102S2. With this arrangement, the master projector 100M can know the average luminance distribution of the whole images.

Next in the second loop processing, the master projector 100M sets a column setting value of an amount of light of the light source, based on the average luminance distribution of the whole images. Each of the master projector 100M and the slave projectors 100S1 and 100S2 sets an amount of light of the light source of the master projector 100M and the slave projectors 100S1 and 100S2 based on the common setting value.

The above embodiments exemplify the technique according to the present disclosure. Therefore, various alterations, replacements, additions, and omissions can be carried out within the claims or within an equal range of the claims.

INDUSTRIAL APPLICABILITY

The present disclosure can be applied to video display apparatuses such as projectors.

What is claimed is:

1. A display apparatus functioning as a master display apparatus connected to first and second slave display apparatuses functioning as slave display apparatuses in order to display on one screen one image including a first image from the master display apparatus, a second image from the first slave display apparatus, and a third image from the second slave display apparatus, the master display apparatus being connected to upstream of the first slave display apparatus, and being connected to downstream of the second slave display apparatus to form a ring single continuous pathway for data communication through the master display apparatus, the first slave display apparatus, and the second slave display apparatus, the master display apparatus comprising:
  a light source;
  a video signal receiver that receives a first video signal;
  an image generator that modulates light from the light source based on the first video signal to generate image light which forms the first image to be projected on the screen;
  a controller that obtains, based on the first video signal, first video characteristic data indicating a characteristic of the first video signal;
  a hardware data outputting unit that outputs the first video characteristic data to the first slave display apparatus;
  a hardware data receiving unit that receives a cumulative value from the second slave display apparatus, the cumulative value being obtained by, through the ring single continuous pathway,
    (1) in the first slave display apparatus, adding second video characteristic data indicating a characteristic of a second video signal received by the first slave display apparatus to the first video characteristic data to obtain third video characteristic data to be sent to the second slave display apparatus, and
    (2) in the second slave display apparatus, adding fourth video characteristic data indicating a characteristic of a third video signal received by the second slave display apparatus to the third video characteristic data to obtain the cumulative value; and
  a controller that calculates a common video setting value from the cumulative value for commonly controlling the light source of the master display apparatus to generate the first image from the first video signal, a light source of the first slave display apparatus to generate the second image from the second video signal, and a light source of the second slave apparatus to generate the third image from the third video signal, wherein:

the first, second, and fourth video characteristic data are average luminance information respectively obtained from the first, second, and third video signals, the common video setting value is common average luminance information obtained by dividing the cumulative value of the average luminance information of the master, first slave and second slave apparatuses by a cumulative value of effective pixel numbers of the image generator of the master display apparatus, an image generator of the first slave display apparatus, and an image generator of the second slave display apparatus, and the controller of the master display apparatus controls the light source of the master display apparatus, a controller of the first slave display apparatus controls a light source of the first slave display apparatus, and a controller of the second slave display apparatus controls a light source of the second slave display apparatus, based on the common average luminance information.

2. The display apparatus according to claim 1, wherein
the first, second, and fourth video characteristic data are average luminance information respectively obtained from the first, second, and third video signals, the common video setting value is common average luminance information obtained by dividing the cumulative value of the average luminance information of each display apparatus by a total number of video display apparatuses including the master display apparatus, the first slave display apparatus, and the second slave display apparatus, and the controller of the master display apparatus controls the light source of the master display apparatus, a controller of the first slave display apparatus controls a light source of the first slave display apparatus, and a controller of the second slave display apparatus controls a light source of the second slave display apparatus, based on the common average luminance information.

3. A display apparatus functioning as a first slave display apparatus connected to a master display apparatus and a second slave display apparatus in order to display on one screen one image including a first image from the master display apparatus, a second image from the first slave display apparatus, and a third image from the second slave display apparatus, the first slave display apparatus being connected to downstream of one of the master display apparatus and the second slave display apparatus and upstream of another of the master display apparatus and the second slave display apparatus to form a ring single continuous pathway for data communication through the master display apparatus, the first slave display apparatus, and the second slave display apparatus, the first slave display apparatus comprising:
  a hardware data receiving unit that receives first video characteristic data from the another of the master display apparatus and the second slave display apparatus, the first video characteristic data indicating a characteristic of a first video signal received by the another of the master display apparatus and the second slave display apparatus,
  a light source;
  a video signal receiver that receives a second video signal;
  an image generator that modulates light from the light source based on the second video signal to generate image light which forms the second image to be projected to the screen;

a controller that:
obtains, based the second video signal, second video characteristic data indicating a characteristic of the second video signal, and
adds the second video characteristic data to the first video characteristic data to obtain a third video characteristic data to obtain third video characteristic data; and
a hardware data outputting unit that outputs the third video characteristic data to the one of the master display apparatus and the second slave display apparatus, wherein
(1) when the second slave display apparatus receives the third video characteristic data, the second slave display apparatus adds fourth video characteristic data indicating a characteristic of a third video signal received by the second slave display apparatus to the third video characteristic data to obtain fifth video characteristic data, and
(2) when the master display apparatus receives the third video characteristic data or the fifth video characteristic data, which is a cumulative value including the video characteristic data from the master display apparatus, the first slave display apparatus, and the second slave display apparatus, the master display apparatus calculates a common video setting value from the cumulative value for commonly controlling a light source of the master display apparatus to generate the first image, the light source of the first slave display apparatus to generate the second image, and a light source of the second slave apparatus to generate the third image,
the controller controls the light source of the first slave display apparatus based on the common video setting value,
the first, second, and fourth video characteristic data are average luminance information respectively obtained from the first, second, and third video signals,
the common video setting value is common average luminance information obtained by dividing the cumulative value of the average luminance information of the master display apparatus, the first slave display apparatus and the second slave display apparatus by a cumulative value of effective pixel numbers of an image generator of the master display apparatus, the image generator of the first slave display apparatus, and an image generator of the second slave display apparatus, and
a controller of the master display apparatus controls a light source of the master display apparatus, the controller of the first slave display apparatus controls the light source of the first slave display apparatus, and a controller of the second slave display apparatus controls a light source of the second slave display apparatus, based on the common average luminance information.

4. The display apparatus according to claim 3, wherein
the first, second, and fourth video characteristic data are average luminance information respectively obtained from the first, second, and third video signals,
the common video setting value is common average luminance information obtained by dividing the cumulative value of the average luminance information of each display apparatus by a total number of video display apparatuses including the master display apparatus, the first slave display apparatus, and the second slave display apparatus, and
a controller of the master display apparatus controls a light source of the master display apparatus, the controller of the first slave display apparatus controls the light source of the first slave display apparatus, and a controller of the second slave display apparatus controls a light source of the second slave display apparatus, based on the common average luminance information.

5. A video display system comprising a plurality of display apparatuses for displaying on one screen an image including a plurality of images from the plurality of display apparatuses, wherein:
each of the plurality of display apparatuses is connected to two of other display apparatuses to form a single continuous pathway for data communication through the plurality of display apparatuses,
each of the plurality of display apparatuses comprises:
a light source;
a video signal receiver that receives a video signal;
an image generator that modulates light from the light source based on the video signal to generate image light which forms one of the plurality of the images to be projected on the screen;
a controller that obtains, based on the video signal received, video characteristic data indicating a characteristic of the video signal; and
a hardware data outputting unit that outputs the video characteristic data to one of the display apparatuses placed downstream in the ring single continuous pathway,
the plurality of display apparatuses includes a master display apparatus, a first slave display apparatus, and a second slave display apparatus,
in the master display apparatus, the controller obtains first video characteristic data indicating a characteristic of a first video signal received by the video signal receiver, and the data outputting unit outputs the first video characteristic data to the first slave display apparatus, through the ring single continuous pathway,
in the first slave display apparatus, the controller obtains second video characteristic data indicating a characteristic of a second video signal received by the video signal receiver, and adds the second video characteristic data to the first video characteristic data to obtain third video characteristic data, and the data outputting unit outputs the third video characteristic data to the second slave display apparatus, through the ring single continuous pathway,
in the second slave display apparatus, the controller obtains fourth video characteristic data indicating a characteristic of a third video signal received by the video signal receiver, and adds the fourth video characteristic data to the third video characteristic data to obtain a cumulative value, and the data outputting unit outputs the cumulative value to the master display apparatus,
the master display apparatus receives the cumulative value from the second slave display apparatus, and calculates a common video setting value from the cumulative value for commonly controlling the light source of the master display apparatus to generate first one of the plurality of images from the first video signal, the light source of the first slave display apparatus to generate second one of the plurality of images from the second video signal, and the light source of the second slave apparatus to generate third one of the plurality of images from the third video signal, the first, second, and fourth video characteristic data are average luminance information respectively obtained from the first, second, and third video signals, and the common video setting value is common average luminance information obtained by dividing the cumulative value of the average luminance information of the master display apparatus, the first slave display apparatus and the second slave display apparatus by a cumulative value of effective pixel numbers of the image generator of the master display apparatus, the image generator of the first slave display apparatus, and the image generator of the second slave display apparatus.

6. The video display system according to claim 5, wherein the first, second, and fourth video characteristic data are average luminance information respectively obtained from the first, second, and third video signals, and the common video setting value is common average luminance information obtained by dividing the cumulative value of the average luminance information of each display apparatus by a total number of video display apparatuses including the master display apparatus, the first slave display apparatus, and the second slave display apparatus.

7. An adjusting method of a plurality of display apparatuses displaying on one screen an image including a plurality of images from the plurality of display apparatuses, each of the plurality of display apparatuses being connected to two of other display apparatuses to form a single continuous pathway for data communication through the plurality of display apparatuses, the method comprising:

setting any one of a plurality of display apparatuses as a master display apparatus, and setting the other display apparatuses as first and second slave display apparatuses, the master display apparatus, the first slave display apparatus, and the second slave display apparatus being arranged in that order in the single continuous pathway;

in the master display apparatus, obtaining first video characteristic data based on a first video signal received by the master display apparatus, the first video characteristic data indicating a characteristic of the first video signal, and outputting the first video characteristic data to the first slave display apparatus;

in the first slave display apparatus, obtaining second video characteristic data based on a second video signal received by the first slave display apparatus, the second video characteristic data indicating a characteristic of the second video signal, adding the second video characteristic data to the first video characteristic data to obtain first cumulative video characteristic data, and outputting the first cumulative video characteristic data to the second slave display apparatus;

in the second slave display apparatus, obtaining third video characteristic data based on a third video signal received by the second slave display apparatus, the third video characteristic data indicating a characteristic of the third video signal, adding the third video characteristic data to the first cumulative video characteristic data to obtain second cumulative video characteristic data, and outputting the second cumulative video characteristic data to the master display apparatus;

in master display apparatus, obtaining a common video setting value from the second cumulative video characteristic data, and setting the common video setting value to the master display apparatus and the first and second slave display apparatuses for commonly controlling a light source of the master display apparatus to generate first one of the plurality of images from the first video signal, a light source of the first slave display apparatus to generate second one of the plurality of images from the second video signal, and a light source of the second slave apparatus to generate third one of the plurality of images from the third video signal, wherein:

the first, second, and third video characteristic data are average luminance level data respectively obtained from the first, second, and third video signals, and the common video setting value is common average luminance information obtained by dividing cumulative average luminance level data by an accumulated pixel number of the master, first slave, and second slave display apparatus, the cumulative average luminance level data is a cumulated value of the average luminance level data respectively obtained from the first, second, and third video signals received by the master display apparatus, the first slave display apparatus and the second display apparatus, respectively.

8. The adjusting method according to claim 7, wherein the first, second, and third video characteristic data are average luminance level data respectively obtained from the first, second, and third video signals, and the common video setting value is common average luminance information obtained by dividing cumulative average luminance level data by a total number of video display apparatuses including the master display apparatus, the first slave display apparatus, and the second slave display apparatus, the cumulative average luminance level data is a cumulated value of the average luminance level data respectively obtained from the first, second, and third video signals.

* * * * *